United States Patent
Ohama

(10) Patent No.: US 7,083,532 B2
(45) Date of Patent: Aug. 1, 2006

(54) GOLF BALL AND METHOD OF MANUFACTURING THE SAME

(75) Inventor: Keiji Ohama, Kobe (JP)

(73) Assignee: SRI Sports Limited, Kobe (JP)

( * ) Notice: Subject to any disclaimer, the term of this patent is extended or adjusted under 35 U.S.C. 154(b) by 0 days.

(21) Appl. No.: 10/854,312

(22) Filed: May 27, 2004

(65) Prior Publication Data

US 2004/0242346 A1    Dec. 2, 2004

(30) Foreign Application Priority Data

May 29, 2003   (JP)   ............... 2003-152825

(51) Int. Cl.
   *A63B 37/04*   (2006.01)
(52) U.S. Cl. .................................... 473/371
(58) Field of Classification Search ............... 473/367, 473/368, 351, 371
   See application file for complete search history.

(56) References Cited

U.S. PATENT DOCUMENTS

| | | | |
|---|---|---|---|
| 4,546,980 A | 10/1985 | Gendreau et al. | |
| 4,561,657 A | 12/1985 | Tominaga et al. | |
| 6,136,906 A | 10/2000 | Sano | |
| 6,306,049 B1 * | 10/2001 | Rajagopalan | ............... 473/377 |

FOREIGN PATENT DOCUMENTS

| | | | |
|---|---|---|---|
| JP | 60-92781 A | 5/1985 |
| JP | 08-196661 A | 8/1996 |
| JP | 09-235413 A | 9/1997 |
| JP | 10-292066 A | 11/1998 |
| JP | 11-057068 A | 3/1999 |
| JP | 11-071480 A | 3/1999 |
| JP | 2002-085591 A | 3/2002 |
| JP | 2002-159595 A | 6/2002 |

* cited by examiner

*Primary Examiner*—Raeann Gorden
(74) *Attorney, Agent, or Firm*—Birch, Stewart, Kolasch & Birch, LLP

(57) ABSTRACT

A golf ball having favorable rebound performance and hit feeling with excellent durability, and a method of manufacturing the same are provided. A golf ball with a solid core formed of a rubber composition having an organic peroxide coated with a thermoplastic resin blended therein as a microcapsule, and a method of manufacturing the same are provided. The micro-encapsulated organic peroxide content is preferably 1–100 mass % with respect to the total organic peroxide.

10 Claims, No Drawings

GOLF BALL AND METHOD OF MANUFACTURING THE SAME

This nonprovisional application is based on Japanese patent application No. 2003-152825 filed with the Japan Patent Office on May 29, 2003, the entire contents of which are hereby incorporated by reference.

BACKGROUND OF THE INVENTION

1. Field of the Invention

The present invention relates to a solid golf ball, and more particularly, to a solid golf ball excellent in homogeneity, rebound performance and durability, and a method of manufacturing the same.

2. Description of the Background Art

Conventionally, the core of the solid golf ball has been manufactured by heating a rubber composition having a co-curing agent such as metal salt of unsaturated carboxylic acid and a free radial initiator blended into a rubber component mainly composed of polybutadiene, to crosslink main chains of rubber molecules. For the metal salt of unsaturated carboxylic acid above, zinc acrylate is generally used to be graft-polymerized onto the main chains of polybutadiene by the free radical initiator such as dicumyl peroxide to form co-crosslinks. The basic physical properties of rubber composition after crosslinking, and properties of a golf ball formed thereof are greatly affected by the state in which the metal salt of unsaturated carboxylic acid or the like is dispersed in the rubber composition, the rate at which the metal salt of unsaturated carboxylic acid or the like reacts to crosslink to the main chains of rubber molecules by the free radical initiator, or the crosslinking formation between the metal salt of unsaturated carboxylic acid or the like and the rubber molecules.

Particularly, the temperature at which an organic peroxide serving as the free radical initiator is decomposed or the blended amount thereof considerably affects the basic physical properties of the core such as coefficient of restitution, hardness or the like. In U.S. Pat. No. 4,546,980, for example, for blending of the core using metal salt of unsaturated carboxylic acid as the co-curing agent, a technique to blend at least two types of free radical initiators (organic peroxides) having different half-lives has been proposed to improve coefficient of restitution. In the technique, at least two types of organic peroxides are dispersed and blended in a substantially uniform manner from a center portion to a surface portion of the core. In crosslinking, however, a temperature gradient is caused from the center portion to the surface portion of the core, and thus the surface portion has a high crosslink density and becomes hardened, which results in poor durability.

Another technique to apply a coat of higher fatty acid or metal salt of higher fatty acid on a particle surface of zinc acrylate used as the co-curing agent to improve dispersibility of the zinc acrylate in the rubber composition has also been proposed (U.S. Pat. No. 4,561,657 and Japanese Patent Laying-Open No. 60-92781). Still another technique to use, as the co-curing agent, metal salt of unsaturated carboxylic acid having an average particle diameter of not more than 5 μm, or unsaturated carboxylate having a particle size distribution of 0.1–5 μm and an average particle diameter of 1–4.5 μm to improve dispersibility of the metal salt of unsaturated carboxylic acid in the rubber composition has also been proposed (Japanese Patent Laying-Open Nos. 8-196661, 9-235413, 11-57068 and U.S. Pat. No. 6,136,906).

These techniques are preferable in that the dispersibility of the co-curing agent in the rubber composition is improved and hardness of the rubber composition is increased. However, due to the co-curing agent so finely dispersed, crosslink density between the main chains of rubber molecules, which is most likely to contribute to rebound performance, is decreased, whereas the pattern of graft polymerization of the co-curing agent with the main chains of rubber molecules, which is unlikely to contribute to rebound performance, is increased, which results in unsatisfactory rebound performance.

As such, the inventor of the present, invention has already proposed a method to use a microcapsule, which is the co-curing agent coated with a thermoplastic resin, to adjust the rate of crosslinking between the main chains of rubber molecules and the rate of graft polymerization between the main chains of rubber molecules and the co-curing agent so as to improve rebound performance (Japanese Patent Laying-Open Nos. 2002-85591 and 2002-159595).

SUMMARY OF THE INVENTION

The present invention relates to a golf ball having a solid core and a cover surrounding the solid core, and provides a golf ball having favorable rebound performance and hit feeling with excellent durability, and a method of manufacturing the same.

The inventor has found that rebound performance and durability can be improved by adjusting a crosslinking rate, crosslink density, and crosslinking formation of rubber in the core composition, which may vary depending on a type and blended amount of the organic peroxide. If the rubber composition is heated to form a core, the crosslinking reaction generates heat, which raises the temperature of the center portion of the core, resulting in a large temperature difference between the center portion and the surface portion of the core. The inventor has found that, by micro-encapsulating the organic peroxide with a thermoplastic resin melting at a temperature intermediate between the central temperature and the surface temperature of the core, the thermoplastic resin of the microcapsule can be controlled such that the thermoplastic resin in the center portion of the core, which is at higher temperature, melts and thus the organic peroxide is released, whereas the thermoplastic resin of the microcapsule in the surface portion, which is at lower temperature, does not melt and thus the organic peroxide is not released.

In other words, according to the findings, at the center portion of the core, two types of organic peroxides consisting of a micro-encapsulated organic peroxide and a non-micro-encapsulated organic peroxide contribute to crosslinking, and thus the crosslinking rate, crosslink density, and crosslinking formation of the rubber can be adjusted, whereas at the surface portion thereof, only a non-micro-encapsulated organic peroxide contributes to crosslinking, and thus appropriate hardness can be obtained due to appropriate crosslinking formation and crosslink density.

The present invention relates to a golf ball having a solid core and a cover surrounding the solid core, characterized in that the solid core is formed of a rubber composition in which an organic peroxide coated with a thermoplastic resin is blended as a microcapsule.

The organic peroxide in the microcapsule form has a content of preferably 1–100 mass % with respect to the total organic peroxide. In addition, the organic peroxide in the microcapsule form preferably has a decomposition temperature different from a decomposition temperature of the organic peroxide not taking the microcapsule form. The thermoplastic resin used for the microcapsule has a softening point preferably in the range of 80° C.–270° C.

A method of manufacturing a golf ball in accordance with the present invention is a method of manufacturing a golf ball having a solid core and a cover surrounding the solid core, characterized in that manufacture of said solid core includes the steps of:

(1) blending a microcapsule having an organic peroxide coated with a thermoplastic resin, into a rubber composition containing a co-curing agent; and (2) heating the rubber composition to a temperature higher than a softening point of the thermoplastic resin for crosslinking.

In the present invention, "decomposition temperature" of the organic peroxide refers to a temperature at which a half-life of a free radical is estimated to be 1 minute.

According to the present invention, the organic peroxide is partially or entirely encapsulated with a film material of a thermoplastic resin and uniformly dispersed in the rubber composition. Due to heat generated during crosslinking reaction, the temperature of the center portion of the solid core rises to at least the softening point of the film material. If the temperature at the surface portion of the solid core is kept below the softening point of the film material, the micro-encapsulated organic peroxide is released from the capsule exclusively at the center portion of the ball, to contribute to the crosslinking reaction, whereas the non-micro-encapsulated organic peroxide contributes to the crosslinking reaction across the entire solid core. Accordingly, the center portion of the solid core can attain a higher crosslink density than the surface portion thereof, and thus a golf ball having favorable rebound performance and hit feeling with excellent durability can be provided.

The foregoing and other objects, features, aspects and advantages of the present invention will become more apparent from the following detailed description of the present invention.

DESCRIPTION OF THE PREFERRED EMBODIMENT

According to the present invention, a golf ball is manufactured by blending an organic peroxide coated with a thermoplastic resin to be micro-encapsulated, into a rubber composition, thereafter molding the rubber composition into a solid core, and surrounding the solid core with a cover. The present invention can also be adopted for, for example, a two-piece golf ball made of two layers having a core and a cover, a multi-piece golf ball having an intermediate layer between a core and a cover, a thread-wound golf ball having a core of the type in which rubber thread is wound around a solid core. The solid core may be a single-layered structure or a multi-layered core having at least two layers.

For a rubber component used for the rubber composition in the solid core, diene rubber of either natural rubber or synthetic rubber may be used, where a rubber component containing polybutadiene rubber is preferably used. In particular, high cis polybutadiene rubber with a cis-1,4 structure content of preferably at least 40%, more preferably at least 90%, is preferably used. It is also possible to blend natural rubber (NR), polyisoprene rubber (IR), styrene-butadiene rubber (SBR), ethylene-propylene-diene terpolymer (EPDM), or other types of diene rubber into the polybutadiene rubber.

According to the present invention, an organic peroxide coated with a thermoplastic resin to be micro-encapsulated is blended into the rubber composition of the solid core. The organic peroxide is blended to serve mainly as a crosslinking initiator to crosslink main chains of rubber molecules. The crosslinking formation by the organic peroxide mainly contributes to rebound performance. The blended amount of the organic peroxide is determined in consideration of desired properties of the solid core.

For the organic peroxide blended into the rubber composition, preferably 1–100 mass %, more preferably 5–95 mass %, still more preferably 10–90 mass % of the total organic peroxide is micro-encapsulated. Micro-encapsulated organic peroxide acts as a crosslinker exclusively at a temperature equal to or above the melting temperature of a thermoplastic resin, that is, the film material of the microcapsule. Therefore, the crosslinking reaction can be controlled by adjusting the temperature of the rubber composition. If the temperature of the solid core's center portion is at or above the melting temperature of the film material and the temperature of the solid core's surface portion is below the melting temperature thereof, then the micro-encapsulated organic peroxide acts as the crosslinker exclusively at the solid core's center portion. As a result, the solid core's center portion can attain higher crosslink density than the surface portion. Micro-encapsulation of at least 1 mass % of the total organic peroxide is preferable because crosslink density can effectively be controlled by the micro-encapsulation. Since the crosslinking reaction may proceed without contribution of the organic peroxide depending on a type and crosslinking temperature of the rubber composition, the desired physical properties may be obtained by micro-encapsulating all the organic peroxide. However, in order to obtain a ball excellent in durability, the micro-encapsulated organic peroxide content is preferably not more than 95 mass %, more preferably not more than 90 mass % of the total organic peroxide. In this case, the non-micro-encapsulated organic peroxide contributes to provide sufficient crosslink density to the solid core's surface portion as well, and thus a ball having excellent durability can be obtained.

According to the present invention, the micro-encapsulated organic peroxide and the non-micro-encapsulated organic peroxide preferably have different decomposition temperatures. In this case, by varying the temperature of the rubber composition, the amount of organic peroxide contributing to the crosslinking reaction can be increased or decreased, and thus the physical properties of the rubber composition can be controlled. For example, if dicumyl peroxide is used as the non-encapsulated organic peroxide, then, for the capsulated organic peroxide, 1,1-bis (t-butylperoxy)-3,3,5-trimethyl cyclohexane or the like which has a lower decomposition temperature, or on the contrary, 2,5-dimethyl-2,5-di(t-butylperoxy) hexyne-3 or the like which has a higher decomposition temperature is preferably used in combination therewith because the physical properties of the rubber composition can easily be controlled within a desired range.

The decomposition temperature of the organic peroxide is preferably 100–270° C., more preferably 110–200° C., and still more preferably 140–200° C. If it is at least 100° C., excess decomposition of the organic peroxide can be prevented during the kneading and crosslinking of the rubber composition. If it is equal to or lower than 270° C., the rubber composition can be crosslinked at a normal temperature, and thus deterioration of the rubber component can be prevented resulting in increased productivity.

The blended amount of organic peroxide is preferably 0.1–5.0 parts by mass, more preferably 0.3–3.5 parts by mass, and still more preferably 0.5–2.5 parts by mass, with respect to 100 parts by mass of the rubber component. If it is at least 0.1 parts by mass, sufficient crosslink density, and accordingly, improved hardness and rebound performance can be achieved. If it is not more than 5.0 parts by mass, excess hardness can be prevented.

Preferable examples of the organic peroxide include dicumyl peroxide, 1,1-bis (t-butyl peroxy)-3,3,5-trimethyl cyclohexane, 2,5-dimethyl-2,5-di(t-butyl peroxy) hexane, di-t-butyl peroxide, di-t-amyl peroxide, t-butyl cumyl peroxide, α,α'-bis(t-butyl peroxy)diiso propyl benzene, n-butyl 4,4-bis(t-butyl peroxy)valerate, 2,2-bis(4,4-di-t-butyl peroxy cyclohexyl)propane, 2,2-bis(t-butyl peroxy)butane, 1,1-di-(t-butyl peroxy)cyclohexane, caprylyd peroxide, lauroyl peroxide, stearoyl peroxide, benzoyl peroxide, p-chloro benzoyl peroxide, t-butyl peroxy acetate, t-butyl peroxy 2-ethyl hexanoate, t-butyl peroxy laurate, 2,4-dichloro benzoyl peroxide, di-t-butyl di peroxy phthalate, 2,5-dimethyl-2,5-di (benzoyl peroxy) hexane, t-butyl peroxy maleic acid, cyclohexanone peroxide, and the like. Among them, dicumyl peroxide, 2,5-dimethyl-2,5-di (t-butyl peroxy)hexane or the like, which has an appropriate decomposition temperature, is particularly preferable. Examples of the organic peroxide preferably used in the present invention and respective decomposition temperatures thereof are shown in Table 1.

TABLE 1

| Organic Peroxide | Decomposition Temperature (° C.) |
| --- | --- |
| t-butyl hydroperoxide | 264 |
| cumene hydroperoxide | 255 |
| diiso propyl benzene hydroperoxide | 205 |
| p-menthane hydroperoxide | 216 |
| 2,5 dimethyl 2,5-dihydroperoxy hexane | 257 |
| 2,5 dimethyl 2,5-dihydroperoxy hexyne-3 | 264 |
| pinene hydroperoxide | 229 |
| di-t-butyl peroxide | 193 |
| di-t-amyl peroxide | 190 |
| t-butyl cumyl peroxide | 178 |
| dicumyl peroxide | 171 |
| 2,5-dimethyl 2,5-di (t-butyl peroxy) hexane | 179 |
| 2,5-dimethyl 2,5-di (t-butyl peroxy) hexyne-3 | 193 |
| α, α'-bis (t-butyl peroxy) diisopropyl benzene | 182 |
| 1,1-bis (t-butyl peroxy) 3,3,5-trimethyl cyclohexane | 153 |
| n-butyl 4,4-bis (t-butyl peroxy) valerate | 165 |
| 2,2-bis (4,4-di-t-butyl peroxy cyclohexyl) propane | 154 |
| 2,2-bis (t-butyl peroxy) butane | 199 |
| 1,1-di-(t-butyl peroxy) cyclohexane | 153 |
| caprylyd peroxide | 114 |
| lauroyl peroxide | 115 |
| stearoyl peroxide | 114 |
| succinic acid peroxide | 144 (in acetone) |
| benzoyl peroxide | 133 |
| p-chloro benzoyl peroxide | 133 |
| 2,4 dichloro benzoyl peroxide | 112 |
| t-butyl peroxy acetate | 159 |
| t-butyl peroxy 2-ethyl hexanoate | 135 |
| t-butyl peroxy laurate | 165 |
| t-butyl peroxy benzoate | 166 |
| di-t-butyl di peroxy phthalate | 159 |
| 2,5-dimethyl 2,5-di (benzoyl peroxy) hexane | 162 |
| t-butyl peroxy maleic acid | 148 (in chloroform) |
| t-butyl peroxy isopropyl carbonate | 158 |
| cyclohexanone peroxide | 174 |

The organic peroxide is micro-encapsulated using a thermoplastic resin as a film material. The softening point of the film material is preferably in the range of 80–270° C., more preferably 100–260° C., and still more preferably 120–250° C. If it is at least 80° C., microcapsules are less likely to be broken during kneading of the rubber component. If it is equal to or lower than 270° C., the film material melts at a normal crosslinking temperature of the rubber composition, providing an ability to prevent deterioration of the rubber component and release the organic peroxide from the microcapsule.

The thermoplastic resin for use as the film material is selected to have a desired softening point depending on the rubber composition's crosslinking temperature, the organic peroxide's decomposition temperature and the like. For the thermoplastic resin, it is possible to use polystyrene, polyethylene, polypropylene, polyurethane, nylon resin, acrylic resin, methacrylic resin, ethlene-acryl copolymer, ethylene-vinyl acetate copolymer, butadiene resin, butene resin, polycarbonate, ABS resin, AS resin, and the like.

As a method of coating the organic peroxide with a thermoplastic resin to form a microcapsule, any of the known methods for micro-encapsulation is adopted. For example, in an air-suspension method, a core material (powder) is fluidized by an airflow and suspended in the air, and an emulsion with a thermoplastic resin as the film material emulsified is sprayed onto the surface of the suspended particle. The suspended air is then heated to vaporize the solvent, so that a capsule film can be formed. Alternatively, in a spray drying method, a core material is suspended in an emulsion with a thermoplastic resin as the film material emulsified therein, and the suspension is sprayed to form fine particles, which are instantaneously dried, and thus a capsule film can be formed. Alternatively, other methods, such as a method of encapsulating a powder particle with another one under a dry condition (i.e. a method in which particles of a core material and finer particles of a film material are mixed together and then an impact is applied by centrifugal force, for example, to embed the film material into the surface of the core material for encapsulation) can be adopted. From the viewpoint of the strength of microcapsule film, the method of encapsulating a powder particle with another one under a dry condition is preferable.

In the microcapsule obtained from the above-described method, the content of organic peroxide is preferably 70–95 mass %. If it is at least 70 mass %, a sufficient amount of organic peroxide is released. If it is not more than 95 mass %, homogeneous microcapsules can be made.

Crosslinking reaction of the solid core according to the present invention is conducted, for example, at a temperature of 140–180° C., preferably at 150–170° C., for 10–60 minutes. The relation between the heating temperature (A) and the softening point (B) of the thermoplastic resin as a film material is set such that (A–B) preferably falls in the range of 0–100° C., more preferably 10–90° C., and still more preferably 20–80° C.

In case of (A>B), the organic peroxide is rapidly released from the microcapsules, and thus the time required for crosslinking can be shortened, and productivity is increased. If (A–B) is equal to or lower than 100° C., microcapsules are less likely to be broken during kneading of the rubber composition.

If the crosslinking reaction is expected at 140–180° C., for example, it is preferred to use, as a film material, a thermoplastic resin such as polypropylene, whose softening point is approximately 140–180° C. Since the crosslinking reaction is exothermic, the crosslinking temperature becomes higher than the heating temperature of the mold. Therefore, it is preferred to control the crosslinking temperature according to an actual measurement value inside the solid core. In the present invention, if the non-micro-encapsulated organic peroxide is used with the micro-encapsulated one, an internal temperature of the rubber composition in the core becomes higher than the heating temperature due to the exhothermic reaction during crosslinking. Therefore, even if (A–B) is 0° C., the organic peroxide is released from the microcapsules.

A softening point of the thermoplastic resin is measured using a thermal mechanical analyzer (TMA). More particularly, a measuring stylus under load is rested to face a sample of the thermoplastic resin in a plate form, and the sample is heated at a predetermined heating rate of 5° C./min, for example, and the temperature at which the measuring stylus penetrates into the sample is obtained as the softening point.

According to the present invention, it is possible to use, as the co-curing agent, α, β-unsaturated carboxylic acid with a carbon number of 3–8, a metal salt thereof or the like, in the rubber composition containing the organic peroxide. Examples of the α, β-unsaturated carboxylic acid include acrylic acid, methacrylic acid, maleic acid, fumaric acid and the like, where acrylic acid and methacrylic acid are particularly suitable for the purpose of improving rebound performance of the rubber composition. Examples of the above-described metal salt include zinc salt, sodium salt, magnesium salt, calcium salt, aluminum salt and the like, where zinc salt is particularly preferable.

The blended amount of the co-curing agent is preferably in the range of 10–50 parts by mass, more preferably 10–45 parts by mass, and still more preferably 15–45 parts by mass with respect to 100 parts by mass of the rubber component. If it is at least 10 parts by mass, the rubber composition can attain a sufficient crosslink density, resulting in improved rebound performance and durability. If it is not more than 50 parts by mass, degradation of the rebound performance due to graft polymerization of the co-curing agent to main chains of rubber molecules can be prevented, resulting in favorable feeling.

In addition, metal powder of high specific gravity, such as tungsten powder or molybdenum powder, metal salt such as zinc oxide, barium sulfate or calcium carbonate, and others may be added to the rubber composition as a filler, which is mainly used to adjust specific gravity. An additive such as an antioxidant may also be added where appropriate.

The solid core is preferably adjusted such that the amount of deformation under loads from an initial load of 98N to a final load of 1274N falls in the range of 2.0–6.0 mm, more preferably 2.5–5.5 mm, and still more preferably 3.0–5.0 mm. If it is at least 2.0 mm, the core has appropriate softness, resulting in favorable hit feeling. If it is not more than 6.0 mm, the core has hardness at or above a certain level, resulting in sufficient rebound performance and durability.

The outside diameter of the solid core is preferably in the range of 10–42 mm, more preferably 20–41 mm, and still more preferably 30–40 mm. If it is at least 10 mm, performance of the solid core can be reflected to the ball performance. If it is not more than 42 mm, a cover with sufficient thickness can be formed, which makes molding of the ball easy, and also provides favorable durability of the ball.

Surface hardness of the solid core is preferably 60–85, more preferably 65–80 in JIS-C hardness. If the surface hardness of the core is at least 60, the core has sufficient hardness, resulting in favorable rebound performance and durability. If the surface hardness of the core is not more than 85, the core has appropriate softness, resulting in favorable hit feeling and durability.

A volume of the solid core according to the present invention is preferably in the range of 30–90%, more preferably 50–85%, and still more preferably 60–80% of the total volume of the golf ball. If it is at least 30%, the effects of the present invention can sufficiently be reflected to the ball performance. If it is at most 90%, sufficient cover thickness can be assured, resulting in favorable durability.

The golf ball according to the present invention is manufactured by surrounding the solid core with a cover. From the viewpoint of improving durability and rebound performance, a polymer component mainly composed of a thermoplastic resin and/or a thermoplastic elastomer is preferably used for the cover composition. For the cover composition, it is possible to use one of, or a mixture including at least two of, ionomer resin, polyethylene resin, polypropylene resin, polyester thermoplastic elastomer, polyamid thermoplastic elastomer, polyurethane thermoplastic elastomer, polystyrene thermoplastic elastomer, trans 1,4-polyisoprene and the like. Particularly, if a blended amount of ionomer resin is at least 50 weight %, preferably at least 70 weight % in the cover composition, durability and rebound performance will be improved.

Herein, the trans 1,4-polyisoprene refers to one having a trans structure content of at least 60% in a polymer molecule. One having a trans structure content of at least 60% has a larger crystalline region and a softening point at a certain level or above, which satisfies the basic properties of the cover.

Examples of the ionomer resin include: a copolymer of α-olefin and α, β-unsaturated carboxylic acid with a carbon number of 3–8, having at least a portion of carboxyl group therein neutralized by a metal ion; a terpolymer of α-olefin, α, β-unsaturated carboxylic acid with a carbon number of 3–8, and α, β-unsaturated carboxylic acid ester with a carbon number of 2–22, having at least a portion of carboxyl group therein neutralized by a metal ion; and others. As the α-olefin above, ethylene, propylene, 1-butene, 1-pentene or the like is used, where ethylene is particularly preferable. As the α, β-unsaturated carboxylic acid with a carbon number of 3–8, acrylic acid, methacrylic acid, fumaric acid, maleic acid, crotonic acid or the like is used, where acrylic acid and methacrylic acid are particularly preferable. As the α, β-unsaturated carboxylic acid ester with a carbon number of 2–22, methyl, ethyl, propyl, n-butyl, isobutyl ester or the like of acrylic acid, methacrylic acid, fumaric acid, maleic acid or the like is used, wherein acrylic ester and methacrylic ester are particularly preferable.

For the metal ion which neutralizes at least a portion of the carboxyl group within the copolymer of α-olefin and α, β-unsaturated carboxylic acid with a carbon number of 3–8, or the terpolymer of α-olefin, α, β-unsaturated carboxylic acid with a carbon number of 3–8, and α, β-unsaturated carboxylic acid ester with a carbon number of 2–22 described above, sodium ion, lithium ion, zinc ion, magnesium ion, potassium ion or the like may be used.

The thickness of the cover is preferably in the range of 0.3–6.0 mm, more preferably in the range of 0.7–5.0 mm, and still more preferably in the range of 1.0–4.0 mm. If it is at least 0.3 mm, sufficient strength and durability of the cover can be obtained. If it is not more than 6.0 mm, an excess increase in volume ratio of the cover component with respect to the total volume of the ball is prevented, and favorable rebound performance of the ball is obtained, and accordingly, the performance of the solid core according to the present invention can sufficiently be reflected to the ball performance. For the cover, a single layered one or a multi-layered one having at least two layers may be used.

In the cover, fiber-reinforced rubber, fiber-reinforced resin, metal powder, metal oxide, colorant, specific gravity regulator, fluorescent brightening agent, lubricant and others may also be blended where appropriate in addition to the component described above.

By using the materials above, a golf ball can be manufactured in a method usually used. For example, the rubber composition containing the micro-encapsulated organic peroxide is first kneaded with a roll, kneader, Banbury mixer or the like. The same is put into a mold and vulcanized under pressure at 140–180° C., preferably 150–170° C. for 10–60 minutes to form a solid core. During the process, in order to achieve large difference in temperatures between the center portion and the surface portion of the core, it is desirable that the vulcanization is conducted at a temperature as high as possible within the range acceptable to the properties of the blend component so as to prompt the crosslinking reaction.

In order to improve cohesion between the solid core and the cover, an adhesive may be applied to the surface of the solid core obtained, or the surface may be roughened. Alternatively, another intermediate layer may be formed outside the solid core using a method of injection molding, for example.

The solid core is then surrounded with a cover, using a method in which the solid core is surrounded with two of half shells made of the molded cover composition and then press-molded at 130–170° C. for 1–5 minutes, a method in which kneaded cover composition is directly injection-molded onto the solid core under the condition, for example, at the temperature of 200–250° C. and the pressure of 3–7 Mpa, and other methods. Finally, the paint is applied where appropriate, for example, to finish the golf ball.

EXAMPLES (1) Manufacture of Microcapsules 5 g of polypropylene (softening point: 160° C.) was dissolved into 50 ml of trichlorobenzene, to which a 20 wt % water solution of organic peroxide shown in Table 2 was added in an amount of 100 g, and stirred for 30 minutes for emulsification. The emulsification state was in the form of (W/O) type emulsion. Next, 1 liter of 4 wt % PVA water solution was prepared, to which the obtained emulsion was added while stirring, so that a [(W/O)/W] type complex emulsion was obtained. The system was gradually heated to 40° C. to vaporize trichlorobenzen. Thereafter, the system was stirred at 55° C. for an hour to cure the film material, so that a microcapsule was obtained. The organic peroxide content within the microcapsule was 80 mass %.

TABLE 2

| Organic Peroxide | Decomposition Temperature (° C.) |
| --- | --- |
| Percumyl D[Note1] | 171 |
| Perhexa 3M[Note2] | 148 |
| Perhexyne 25B[Note3] | 193 |

[Note1]"Percumyl D" was dicumyl peroxide available from NOF Corporation.
[Note2]"Perhexa 3M" was 1,1-bis (t-butyl peroxy)-3,3,5-trimethyl cyclohexane, available from NOF Corporation.
[Note3]"Perhexyne 25B" was 2,5-dimethyl-2,5-di (t-butyl peroxy) hexyne-3, available from NOF Corporation.

(2) Production of Solid Core

The rubber composition shown in Table 3 was kneaded using a kneader and roll, and subjected to thermal-press-molding at 160° C. for 20 minutes so that a solid core having a core diameter shown in Table 3 was produced. The temperature of the rubber composition during kneading was controlled such that the temperature would not exceed 100° C.

TABLE 3

| | | | Ex. 1 | Ex. 2 | Ex. 3 | Ex. 4 | Comp. Ex. 1 | Comp. Ex. 2 | Comp. Ex. 3 | Comp. Ex. 4 |
| --- | --- | --- | --- | --- | --- | --- | --- | --- | --- | --- |
| Core | Blend | BR-11[Note4] | 100 | 100 | 100 | 100 | 100 | 100 | 100 | 100 |
| | | Zinc acrylate[Note5] | 26 | 28 | 21 | 28 | 16 | 28 | 26 | 21 |
| | | Zinc oxide[Note6] | 10 | 10 | 10 | 10 | 10 | 10 | 10 | 10 |
| | | Barium sulfate[Note7] | Proper amount | Proper amount | Proper amount | Proper amount | Proper amount | Proper amount | Proper amount | Proper amount |
| | | Capsule Percumyl D | — | — | — | 0.6 | — | — | — | — |
| | | Perhexa 3M | 0.8 | 0.6 | — | — | — | — | — | — |
| | | Perhexyne 25B | — | — | 0.6 | — | — | — | — | — |
| | | Percumyl D | 0.6 | 0.6 | 0.6 | 0.6 | 0.6 | 1.2 | 0.6 | 0.6 |
| | | Perhexa 3M | — | — | — | — | — | — | 0.8 | — |
| | | Encapsulated organic peroxide/ total organic peroxide (%) | 57.1 | 50 | 50 | 50 | 0 | 0 | 0 | 0 |
| | Property | Diameter of core (mm) | 39.6 | 39.6 | 39.4 | 39.6 | 39.6 | 39.6 | 39.6 | 36.4 |
| | | Amount of deformation (mm) | 3.6 | 3.3 | 4.6 | 3.3 | 3.8 | 3.0 | 3.4 | 4.8 |
| | | Surface hardness of core (mm) | 80 | 83 | 75 | 83 | 80 | 87 | 86 | 74 |
| Cover | | Thickness of inner layer (mm) | — | — | 1.6 | — | — | — | — | 1.6 |
| | | Thickness of outer layer (mm) | 1.6 | 1.6 | 1.6 | 1.6 | 1.6 | 1.6 | 1.6 | 1.6 |

TABLE 3-continued

|  |  | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|---|
| Ball Property | Coefficient of restitution | 1.02 | 1.03 | 1.02 | 1.02 | 1.00 | 1.03 | 1.02 | 0.98 |
|  | Durability | 115 | 120 | 120 | 115 | 100 | 110 | 105 | 105 |
|  | Carry (distance) | 178 | 179 | 180 | 178 | 176 | 179 | 178 | 175 |
|  | Hit Feeling (impact) | ○ | ○ | ○ | ○ | ○ | X | Δ | ○ |
|  | Hit Feeling (rebound performance) | ○ | ○ | ○ | ○ | ○ | ○ | ○ | Δ |

(Note4)"BR-11", available from JSR Corporation, was polybutadiene rubber having a cis-1, 4 structure content of 96%.
(Note5)zinc acrylate was "ZNDA-90S" available from Nippon Shokubai Co., Ltd.
(Note6)zinc oxide was available from Toho Zinc Co., Ltd.
(Note7)barium sulfate was "Barite #100" available from Sakai Chemical Co., Ltd.

(3) Manufacture of Cover Composition and Golf Ball

The cover composition shown in Table 4 was injection-molded on the solid core obtained to have a thickness shown in Table 3. Clear paint made of urethane was then applied thereon.

TABLE 4

|  | Inner layer cover | Outer layer cover |
|---|---|---|
| Hi-milan 1605(Note8) | 60 | 40 |
| Hi-milan 1706(Note9) | 40 | 30 |
| Rabalon SR04(Note10) | — | 30 |
| Titanium oxide(Note11) | 2 | 2 |
| Barium sulfate(Note7) | 2 | 2 |
| Hardness (JIS-C) | 93 | 75 |

(Note8)"Hi-milan 1605" was an ionomer neutralized with sodium, available from DuPont-Mitsui Polychemical Co., Ltd.
(Note9)"Hi-milan 1706" was an ionomer neutralized with zinc, available from Dupont-Mitsui Polychemical Co., Ltd.
(Note10)"Rabalon SR04" was an SEBS polymer alloy available from Mitsubishi Chemical Corporation.
(Note11)titanium oxide was "A-220" available from Ishihara Sangyou Kaisha Ltd.

(4) Surface Hardness of Core

In accordance with JIS-K6301, surface hardness of the core was measured using a spring-type hardness tester (type C). The results were shown in Table 3.

(5) Cover Hardness

A thermal-press-molded sheet made of the cover composition with a thickness of approximate 2 mm was preserved at 23° C. for 2 weeks. Afterwards, three of the molded sheets were stacked, and cover hardness was measured using the spring-type hardness tester (type C) in accordance with JIS-K6301. The results were shown in Table 3.

(6) Amount of Deformation of Core by Compression

An amount of deformation of the solid core under loads from an initial load of 98N to a final load 1275N was measured. The results were shown in Table 3.

(7) Coefficient of Restitution of Ball

A circular column made of aluminum with a weight of 200 g was struck forward at an initial rate of 40 m/s. By using the propelling rate of the golf ball at the time when the column collided against the same, coefficient of restitution was determined. Measurement was conducted using 12 balls in each example to calculate the mean value. The results were shown in Table 3.

(8) Durability of Ball

A W#1 driver with a metal head was attached to a swing robot available from True Temper Sports. A ball was then struck at a head speed set to 45 m/s against a collision plate. The ball was repeatedly struck and the number of strikes with which the ball was broken was measured. The numbers were shown as relative values to Comparative Example 2, which was set to 100. The results were shown in Table 3.

(9) Carry (Distance)

A Wood (XXIOR: 11°) #1 club (driver) with a metal head was attached to a swing robot available from True Temper Sports. A golf ball was struck at a head speed of 40 m/s. The distance till the point where it came to rest after landing was measured as carry (distance). Measurement was conducted using 12 balls in each example to calculate the mean value. The results are shown in Table 3.

(10) Hit Feeling

An actual hitting test was performed by 10 golfers using a Wood #1 club (W#1, driver), and hit feeling was evaluated from the number of the golfers who answered that there was a smaller impact, certain rebound feeling, and favorable hit feeling upon striking. The results were shown in Table 3.

○ . . . at least 7 golfers
Δ . . . 5–6 golfers
x . . . at most 4 golfers

Examples 1–4, in which a micro-encapsulated organic peroxide and a non-micro-encapsulated organic peroxide are blended, provide improved coefficient of restitution, durability, carry (distance) and excellent hit feeling, compared to Comparative Examples 1–4, which contain only a non-micro-encapsulated organic peroxide. These results show that the golf ball in accordance with the present invention has sufficient coefficient of restitution, favorable hit feeling, and excellent durability as well.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A golf ball comprising a solid core and a cover surrounding said solid core, wherein said solid core is formed of a rubber composition in which an organic peroxide coated with a thermoplastic resin is blended as a microcapsule, and said microcapsule resides in at least a surface portion of said solid core.

2. The golf ball according to claim 1, wherein the organic peroxide in the microcapsule form has a content of 1–100 mass % with respect to a total organic peroxide.

3. The golf ball according to claim 1, wherein the organic peroxide in the microcapsule form has a decomposition temperature different from a decomposition temperature of an organic peroxide not taking the micro capsule form.

4. The golf ball according to claim 1, wherein the thermoplastic resin has a softening point in a range of 80° C.–270° C.

5. A method of manufacturing a golf ball having a solid core and a cover surrounding said solid core, manufacture of said solid core including the steps of:

(1) blending a microcapsule having an organic peroxide coated with a thermoplastic resin, into a rubber composition containing a co-curing agent; and (2) heating said rubber composition to a temperature higher than a softening point of said thermoplastic resin for crosslinking.

6. The golf ball according to claim 1, wherein the organic peroxide is in the microcapsule form and in the non-microcapsule form, and the organic peroxide in the microcapsule form has a content of 5–95 mass % with respect to a total organic peroxide.

7. The golf ball according to claim 1, wherein a content of the organic peroxide is 70–95 mass % in the microcapsule.

8. The golf ball according to claim 6, wherein a content of the organic peroxide is 70–95 mass % in the microcapsule.

9. The method according to claim 5, wherein the organic peroxide is in the microcapsule form and in the non-microcapsule form, and the organic peroxide in the microcapsule form has a content of 5–95 mass % with respect to a total organic peroxide.

10. The method according to claim 5, wherein a content of the organic peroxide is 70–95 mass % in the microcapsule.

* * * * *